United States Patent [19]

Tempest

[11] Patent Number: 5,147,165
[45] Date of Patent: Sep. 15, 1992

[54] CENTRIFUGAL SPINDLE

[75] Inventor: Michael C. Tempest, Poole, United Kingdom

[73] Assignee: Federal Mogul Westwind Air Bearings Ltd., United Kingdom

[21] Appl. No.: 768,230

[22] PCT Filed: Feb. 27, 1991

[86] PCT No.: PCT/GB91/00302
§ 371 Date: Oct. 18, 1991
§ 102(e) Date: Oct. 18, 1991

[87] PCT Pub. No.: WO91/13716
PCT Pub. Date: Sep. 19, 1991

[30] Foreign Application Priority Data

Mar. 7, 1990 [GB] United Kingdom ............. 900513

[51] Int. Cl.$^5$ ............................................. B23B 31/14
[52] U.S. Cl. .................................. 409/232; 279/131; 408/240
[58] Field of Search .................... 409/231, 232, 234; 408/239 R, 239 A, 240; 433/129; 279/129, 131

[56] References Cited

U.S. PATENT DOCUMENTS

| 1,990,525 | 2/1935 | Chancellor | 279/131 X |
| 2,686,682 | 8/1954 | Csaki | 279/131 X |
| 3,625,528 | 12/1971 | Sage | 279/131 |

Primary Examiner—Z. R. Bilinsky
Attorney, Agent, or Firm—Shoemaker & Mattare, Ltd.

[57] ABSTRACT

A centrifugal spindle is described comprising a hollow shaft (1) having a collet (2) at one end for gripping a tool shank (12) and a centrifugal loading means (3) housed within the shaft (1). The loading means comprises two coaxial pistons (4,5) spaced from each other and linked by flexible connecting members (6) and intermediate bob weights (7). One piston (4) is secured axially to the hollow shaft (1) while the other piston is secured to the collet so that rotation of the shaft (1) causes the weights (7) to move radially outwards under centrifugal force to draw the piston (5) and collet (2) into the hollow shaft (1) gripping the tool shank (12). The collet may have spring loaded jaws forcing them into the closed position.

7 Claims, 1 Drawing Sheet

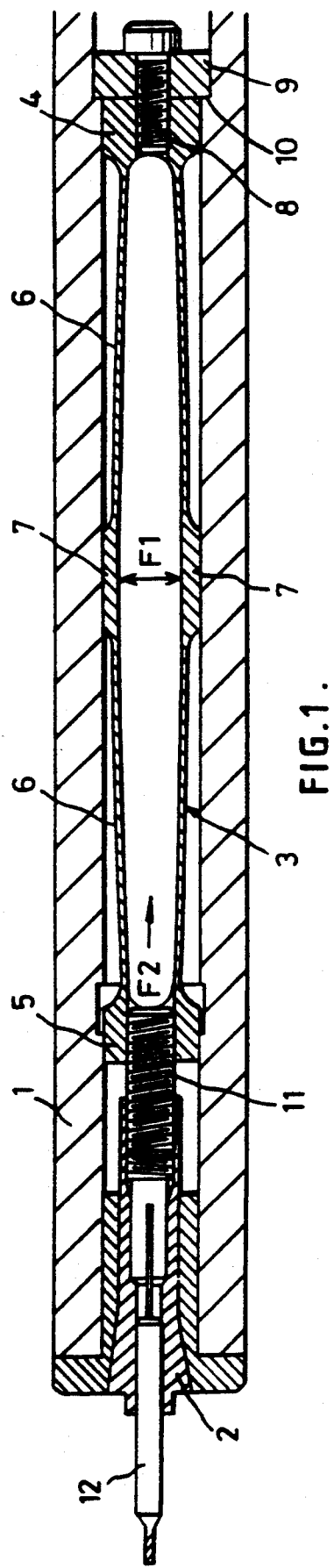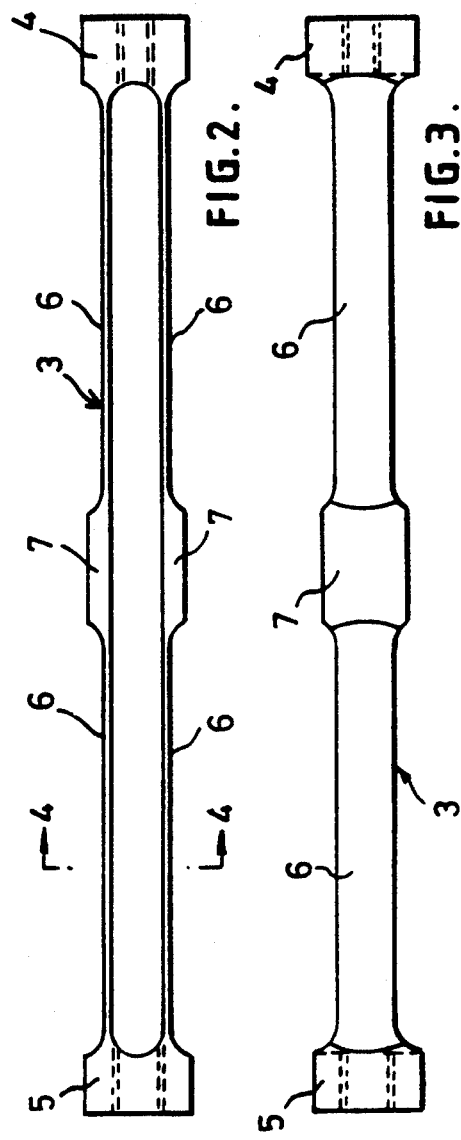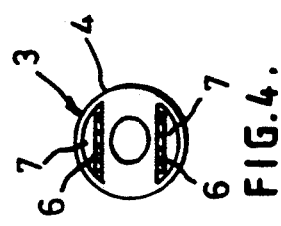

CENTRIFUGAL SPINDLE

This invention relates to a centrifugal spindle and more particularly to the control of collets to grip the shank of tools of different sizes.

In a typical spindle, the shaft has a collet for gripping tools which can be opened and closed by means of a signal.

A typical method of operation of these known spindles is to utilize disc springs built into the shaft and a pneumatic ram system to compress the springs when required to open the collet. When the air supply to the ram system is released, the ram withdraws and the disc springs draw the collet into the shaft, firmly clamping the tool shank in position. These known spindles have the disadvantage that the pneumatic system is somewhat cumbersome.

An aim of the present invention is to overcome the above mentioned disadvantage and provide an improved and simplified control of the collet to grip the shank of the tools.

According to the present invention there is provided a centrifugal spindle comprising a hollow shaft having a collet at one end for gripping a tool shank and a centrifugal loading means housed within the hollow shaft, wherein the loading means comprises two coaxial pistons spaced from each other and linked by flexible connecting members, one piston being secured axially to the hollow shaft while the other piston is secured to the collet so that rotation of the shaft causes the flexible connecting members to move radially outwards under centrifugal force to draw the piston and collet into the hollow shaft gripping the tool shank.

In a preferred construction of the centrifugal spindle, weights are connected to the flexible members intermediate their ends.

Preferably, there are two flexible connecting members with two intermediate weights.

Conveniently, the flexible connecting members have a flat cross-section and the weights have a curved surface, the connecting members being formed integral with the pistons and weights.

An embodiment of a centrifugal spindle and collet according to the invention will now be described, by way of example only, with reference to the accompanying drawings, in which:

FIG. 1 is an axial cross-section of a centrifugal spindle;

FIG. 2 is a side elevation of the centrifugal loading means;

FIG. 3 is a plan view of the loading means shown in FIG. 2; and

FIG. 4 is a cross-section taken along the line 4—4 of FIG. 3.

The centrifugal spindle comprises a hollow shaft 1 fitted with a collet 2 fixed to a centrifugal loading means generally indicated at 3. This loading means comprises two coaxial pistons 4 and 5 linked together by flexible members 6. Intermediate bob weights 7 are formed integrally with the members 6 and the pistons 4 and 5.

One piston 4 is secured axially to one end of the hollow shaft 1 by a screw-threaded bolt 8 which passes through an annular member 9 engaging a shoulder 10 of the shaft and is screwed into the end of the piston 4. Annular member 9 is secured by suitable means to the hollow shaft 1. The other piston 5 is connected axially with the collet 2 by a screw-threaded pin 11, the ends of which screw into the collet 2 and piston 5, respectively.

As can be seen in the cross-section in FIG. 4, the flexible members 6 have a flat cross-section and are integrally formed with the pistons 4 and 5 and bob weights 7 which have a curved outer surface which conforms to the inner diameter of the hollow shaft.

In operation, when the centrifugal spindle is rotated about its longitudinal axis, centrifugal force F1 acts upon both the flexible members 6 and bob weights 7. This force F1, causes both the flexible members 6 and the bob weights 7 to move radially outwards. The geometric form of the flexible members 6 is such that the radial forces generated by the bob weights 7 are greatly amplified in the axial direction. The axial force F2 so generated draws the collet 2 into the shaft 1, thus providing the desired grip on the tool shank 12.

The problem with a centrifugal collet is that the radial forces generated increase with the square of the speed and, if one is to achieve an adequate clamping force at relatively low speed, then the clamping force at high speed is excessive. In order to avoid this excessive axial force being generated at high speed, the dimensions of the member 6 are so arranged that the bob weights 7 come into contact with the shaft bore at a predetermined speed. The axial load on the collet is thus held constant at speeds above the defined level.

As the shaft is reduced in speed from the working condition, so the centrifugal force deminishes and the centrifuqal device is manufactured in such a way that inherent spring qualities within the flexible members 6 restore them to their original condition.

The effect of these spring forces is to generate a considerable axial force, thus pushing the collet forward thus releasing the tool.

In the centrifugal device according to the invention, the collet is in the open position, until a predetermined rotational speed has been reached resulting in the tool being clamped in the collet. However the tool has to be capable of being removed when the shaft is static, but must also be lightly gripped under these conditions, so that it remains in place when the shaft is stationary. There are a number of means by which this objective may be achieved, for example, these requirements can be met by selecting a suitable spring tension in the jaws of the collet. If the natural shape of the jaws forms a bore slightly less than the size of the tool shank, then when the said shank is inserted into the collet jaws, it will be held under static conditions. It can also be removed without difficulty.

I claim:

1. A centrifugal spindle comprising a hollow shaft having a collet at one end for gripping a tool shank, characterised by a centrifugal loading means housed within the hollow shaft (1) wherein the loading means comprises two coaxial pistons (4, 5) spaced from each other and linked by flexible connecting members (6), one piston (4) being secured axially to the hollow shaft while the other piston (5) is secured to the collet (2) so that rotation of the shaft causes the flexible connecting members to move radially outwards under centrifugal force to draw the piston and collet into the hollow shaft gripping the tool shank (12).

2. A centrifugal spindle as claimed in claim 1, characterised in that weights (7) are connected to the flexible members intermediate their ends.

3. A centrifugal spindle as claimed in claim 2, characterised in that there are two flexible connecting members (6) with two intermediate weights (7).

4. A centrifugal spindle as claimed in claim 1 characterised in that one of the pistons is fixed to the hollow shaft by a screw-threaded bolt (8) passing through an annular member (9) engaging a shoulder (10) in the shaft and is screwed into the piston (4).

5. A centrifugal spindle as claimed in claim 1, characterised in that the collet is connected axially to one of the pistons by a screw-threaded pin (11), the ends of which screw into the collet (2) and piston (5) respectively.

6. A centrifugal spindle as claimed in claim 2, characterised in that the flexible connecting members have a flat cross-section and the weights have a curved outer surface the connecting members being formed integral with the pistons and weights.

7. A centrifugal spindle as claimed in claim 1, characterised in that the collet has jaws which are spring-loaded into the closed position.

* * * * *